(12) United States Patent
Warren et al.

(10) Patent No.: US 11,099,533 B2
(45) Date of Patent: Aug. 24, 2021

(54) CONTROLLING A BUILDING SYSTEM BASED ON REAL TIME EVENTS

(71) Applicant: Vivint, Inc., Provo, UT (US)

(72) Inventors: Jeremy B. Warren, Draper, UT (US); Brandon Bunker, Highland, UT (US); Jefferson Lyman, Alpine, UT (US); Jungtaik Hwang, Draper, UT (US)

(73) Assignee: Vivint, Inc., Provo, UT (US)

( * ) Notice: Subject to any disclaimer, the term of this patent is extended or adjusted under 35 U.S.C. 154(b) by 555 days.

(21) Appl. No.: 14/272,086

(22) Filed: May 7, 2014

(65) Prior Publication Data

US 2015/0323915 A1 Nov. 12, 2015

(51) Int. Cl.
*H04L 12/28* (2006.01)
*G05B 15/02* (2006.01)

(52) U.S. Cl.
CPC .......... *G05B 15/02* (2013.01); *H04L 12/2803* (2013.01)

(58) Field of Classification Search
None
See application file for complete search history.

(56) References Cited

U.S. PATENT DOCUMENTS

| | | |
|---|---|---|
| 4,174,064 A | 11/1979 | Pratt |
| 5,344,068 A | 9/1994 | Haessig et al. |
| 5,668,446 A | 9/1997 | Baker et al. |
| 5,699,243 A | 12/1997 | Eckel et al. |
| 5,909,378 A | 6/1999 | De Milleville et al. |
| 5,924,486 A | 7/1999 | Ehlers et al. |
| 5,962,989 A | 10/1999 | Baker et al. |
| 5,973,594 A | 10/1999 | Baldwin et al. |
| 6,108,614 A | 8/2000 | Lincoln et al. |
| 6,216,956 B1 | 4/2001 | Ehlers et al. |
| 6,263,260 B1 | 7/2001 | Bodmer et al. |
| 6,377,858 B1 | 4/2002 | Koeppe |
| 6,759,954 B1 | 7/2004 | Myron et al. |
| 7,469,550 B2 | 12/2008 | Chapman, Jr. et al. |
| 7,761,186 B2 | 7/2010 | Fadell et al. |
| 7,765,033 B2 | 7/2010 | Perry |
| 7,918,406 B2 | 4/2011 | Rosen |
| 8,066,558 B2 | 11/2011 | Thomle et al. |

(Continued)

FOREIGN PATENT DOCUMENTS

| | | |
|---|---|---|
| GB | 2448896 A | 11/2008 |
| KR | 1020130107838 | 10/2013 |

(Continued)

OTHER PUBLICATIONS

International Search Report and Written Opinion of the International Searching Authority for PCT/US2015/029670, dated Sep. 3, 2015.

(Continued)

*Primary Examiner* — Isaac T Tecklu
(74) *Attorney, Agent, or Firm* — Holland & Hart, LLP

(57) ABSTRACT

Methods and systems are described for controlling parameters in a building. According to at least one embodiment, a method for controlling a building system includes using at least one sensor to detect occupancy in a building over time, determining a predictive schedule based on the occupancy detected with the at least one sensor, and associate real time events that occur simultaneously with an occupancy state of the predictive schedule.

18 Claims, 10 Drawing Sheets

(56) References Cited

U.S. PATENT DOCUMENTS

| | | | |
|---|---|---|---|
| 8,086,352 | B1 | 12/2011 | Elliott |
| 8,111,131 | B2 | 2/2012 | Zaveruha et al. |
| 8,180,492 | B2 | 5/2012 | Steinberg |
| 8,195,313 | B1 | 6/2012 | Fadell et al. |
| 8,214,061 | B2 | 7/2012 | Westrick, Jr. et al. |
| 8,219,251 | B2 | 7/2012 | Amundson et al. |
| 8,237,540 | B2 | 8/2012 | Zaveruha et al. |
| 8,280,536 | B1 | 10/2012 | Fadell et al. |
| 8,335,842 | B2 | 12/2012 | Raji et al. |
| 8,350,697 | B2 | 1/2013 | Trundle et al. |
| 8,386,082 | B2 | 2/2013 | Oswald |
| 8,410,896 | B2 | 4/2013 | Zaveruha et al. |
| 8,412,654 | B2 | 4/2013 | Montalvo |
| 8,457,793 | B2 | 6/2013 | Golding et al. |
| 8,457,796 | B2 | 6/2013 | Thind |
| 8,458,102 | B2 | 6/2013 | Bill |
| 8,478,447 | B2 | 7/2013 | Fadell et al. |
| 8,489,243 | B2 | 7/2013 | Fadell et al. |
| 8,510,255 | B2 * | 8/2013 | Fadell ................. G05B 15/02 706/52 |
| 8,511,576 | B2 | 8/2013 | Warren et al. |
| 8,511,577 | B2 | 8/2013 | Warren et al. |
| 8,523,083 | B2 | 9/2013 | Warren et al. |
| 8,532,827 | B2 | 9/2013 | Stefanski et al. |
| 8,538,596 | B2 | 9/2013 | Gu et al. |
| 8,543,244 | B2 | 9/2013 | Keeling et al. |
| 8,544,285 | B2 | 10/2013 | Stefanski et al. |
| 8,554,376 | B1 | 10/2013 | Matsuoka et al. |
| 8,556,188 | B2 | 10/2013 | Steinberg |
| 8,558,179 | B2 | 10/2013 | Filson et al. |
| 8,560,128 | B2 | 10/2013 | Ruff et al. |
| 8,600,562 | B2 | 12/2013 | Oswald |
| 8,620,841 | B1 | 12/2013 | Filson et al. |
| 8,622,314 | B2 | 1/2014 | Fisher et al. |
| 8,627,127 | B2 | 1/2014 | Mucignat et al. |
| 8,630,740 | B2 | 1/2014 | Matsuoka et al. |
| 8,630,741 | B1 * | 1/2014 | Matsuoka ........... H04L 12/2829 700/12 |
| 8,850,348 | B2 | 9/2014 | Fadell et al. |
| 9,245,229 | B2 * | 1/2016 | Fadell ................. G05B 15/02 |
| 9,441,847 | B2 | 9/2016 | Grohman |
| 2002/0134849 | A1 | 9/2002 | Disser |
| 2007/0032225 | A1 | 2/2007 | Konicek et al. |
| 2008/0079569 | A1 | 4/2008 | Axelsen |
| 2010/0025483 | A1 | 2/2010 | Hoeynck et al. |
| 2010/0289643 | A1 * | 11/2010 | Trundle ................. G08C 19/16 340/545.1 |
| 2011/0046792 | A1 * | 2/2011 | Imes ..................... F24F 11/63 700/278 |
| 2011/0181412 | A1 | 7/2011 | Alexander et al. |
| 2011/0253796 | A1 | 10/2011 | Posa et al. |
| 2012/0025717 | A1 | 2/2012 | Klusmann et al. |
| 2012/0066168 | A1 * | 3/2012 | Fadell ................. G05B 15/02 706/52 |
| 2012/0072030 | A1 | 3/2012 | Elliot |
| 2012/0085831 | A1 | 4/2012 | Kopp |
| 2012/0086568 | A1 | 4/2012 | Scott et al. |
| 2012/0143356 | A1 | 6/2012 | Berg-Sonne et al. |
| 2012/0143357 | A1 | 6/2012 | Chemel et al. |
| 2012/0143810 | A1 | 6/2012 | Berg-Sonne |
| 2012/0150788 | A1 | 6/2012 | Berg-Sonne et al. |
| 2012/0165993 | A1 * | 6/2012 | Whitehouse ....... G05D 23/1904 700/278 |
| 2012/0186774 | A1 * | 7/2012 | Matsuoka ............. G05B 15/02 165/11.1 |
| 2012/0259469 | A1 | 10/2012 | Ward et al. |
| 2012/0261481 | A1 | 10/2012 | Donlan |
| 2012/0265501 | A1 | 10/2012 | Goldstein et al. |
| 2012/0271460 | A1 | 10/2012 | Rognli |
| 2012/0299728 | A1 | 11/2012 | Kirkpatrick et al. |
| 2012/0310376 | A1 * | 12/2012 | Krumm ................. G05B 15/02 700/31 |
| 2013/0030600 | A1 * | 1/2013 | Shetty .................. F24F 11/006 700/300 |
| 2013/0060360 | A1 | 3/2013 | Yamamoto |
| 2013/0073094 | A1 * | 3/2013 | Knapton ............... G05B 13/02 700/278 |
| 2013/0151012 | A1 | 6/2013 | Shetty et al. |
| 2013/0173064 | A1 | 7/2013 | Fadell et al. |
| 2013/0245837 | A1 | 9/2013 | Grohman |
| 2013/0268124 | A1 | 10/2013 | Matsuoka et al. |
| 2013/0268125 | A1 | 10/2013 | Matsuoka |
| 2013/0292481 | A1 | 11/2013 | Filson et al. |
| 2013/0297555 | A1 | 11/2013 | Fadell et al. |
| 2013/0325189 | A1 | 12/2013 | Miura |
| 2014/0005837 | A1 | 1/2014 | Fadell et al. |
| 2014/0012821 | A1 | 1/2014 | Fuhrmann et al. |
| 2014/0098596 | A1 | 4/2014 | Poulton et al. |
| 2014/0107846 | A1 | 4/2014 | Li |
| 2014/0239817 | A1 * | 8/2014 | Leinen ................. H05B 37/02 315/152 |
| 2015/0070181 | A1 * | 3/2015 | Fadell ................. G08B 19/00 340/628 |
| 2015/0264777 | A1 * | 9/2015 | Leinen ................. H05B 37/02 315/152 |
| 2015/0285527 | A1 * | 10/2015 | Kim ..................... F24F 11/006 700/276 |
| 2015/0297778 | A1 * | 10/2015 | Conroy ................. B05B 7/2416 239/11 |
| 2015/0308706 | A1 * | 10/2015 | Bunker ................. F24F 11/0034 700/275 |
| 2015/0309484 | A1 | 10/2015 | Lyman |
| 2015/0323915 | A1 * | 11/2015 | Warren ............... H04L 12/2803 700/275 |
| 2015/0347916 | A1 * | 12/2015 | Warren ................. G05B 15/02 706/11 |
| 2016/0004237 | A1 * | 1/2016 | Mohan ................. G05B 15/02 700/275 |
| 2017/0153613 | A1 * | 6/2017 | Agarwal .............. G05B 19/048 |
| 2017/0223798 | A1 | 8/2017 | Shah et al. |
| 2017/0273162 | A1 | 9/2017 | Tran |
| 2018/0040232 | A1 | 2/2018 | Wedig et al. |
| 2018/0320908 | A1 * | 11/2018 | Lorenz ................. F24D 19/1048 |

FOREIGN PATENT DOCUMENTS

| | | |
|---|---|---|
| KR | 1020140047851 | 4/2014 |
| WO | 2009036764 A2 | 3/2009 |
| WO | 2012142477 A3 | 1/2010 |
| WO | 2014033189 | 3/2014 |

OTHER PUBLICATIONS

Allure Energy, Eversense, www.allure-energy.com/mainpage.html, accessed on Apr. 2, 2014, 7 pages.

Ecobee Inc., Ecobee, http://www.ecobee.com/, accessed on Apr. 2, 2014, 5 pages.

Erickson et al., Occupancy Based Demand Response HVAC Control Strategy, University of California Merced, 2010, 6 pages.

Erickson et al., Observe: Occupancy-Based System for Efficient Reduction of HVAC Energy, University of California Merced, Electrical Engineering and Computer Science, 2011, 12 pages.

Gao et al., Spot: A Smart Personalized Office Thermal Control System, School of Computer Science, University of Waterloow, Waterloo, Ontario, May 24, 2013, 10 pages.

Gupta et al., Adding GPS-Control to Traditional Thermostats:An Exploration of Potential Energy Savings and Design Challenges, Massachusetts Institute of Technology, Cambridge, 2009, 18 pages.

Kleiminger et al., Predicting household occupancy for smart heating control: A comparative performance analysis of state-of-the-art approaches, Institute for Pervasive Computing, ETCH Zurich and Wireless Sensor Networks Lab, TU Darmstadt, 2013, pp. 1-26.

Koehler et al., UbiComp '13 Proceedings of the 2013 ACM international joint conference on Pervasive and ubiquitous computing, New York, 2013, Abstract only, 1 page.

Lee et al., Occupancy Prediction Algorithms for Thermostat Control Systems Using Mobile Devices, IEEE Transactions on Smart Grid 4.3: 1332-40, IEEE, Sep. 2013. Abstract only, 3 pages.

(56) References Cited

OTHER PUBLICATIONS

Lu et al., The Smart Thermostat: Using Occupancy Sensors to Save Energy in Homes, Department of Computer Science, University of Virginia and School of Architecture, University of Virginia, Nov. 5, 2011, 14 pages.

Mamidi et al., Smart Sensing, Estimation, and Prediction for Efficient Building Energy Management, Information Sciences Institute, University of Southern California, 2011, 10 pages.

Mamidi et al., Improving Building Energy Efficiency with a Network of Sensing, Learning and Prediction Agents, Information Sciences Institute, University of Southern California, 2012, 8 pages.

Nest Labs, Inc., Nest Thermostat, https://nest.com/thermostat/life-with-nest-thermostat/, accessed on Apr. 2, 2014, 15 pages.

Scott et al., Home Heating Using GPS-Based Arrival Prediction, Microsoft Research, Feb. 24, 2010, 6 pages.

Scott et al., PreHeat: Controlling Home Heating Using Occupancy Prediction, Proceeding, UbiComp '11 Proceedings of the 13th international conference on Ubiquitous computing, Sep. 21, 2011, 10 pages.

Gupta et al., Adding GPS-Control to Traditional Thermostats: An Exploration of Potential Energy Savings and Design Challenges, Massachusetts Institute of Technology, 2009, Abstract only, 6 pages.

Tado Inc., Tado, The Heating App, http://www.tado.com/de-en/, accessed on Feb. 14, 2014, 8 pages.

Vazquez et al., Impact of user habits in smart home control, IEEE 16th Conference on Emerging Technologies & Factory Automation (ETFA), Sep. 2011, Abstract only, 2 pages.

Wooley et al., Occupancy Sensing Adaptive Thermostat Controls: A Market Review and Observations from Multiple Field Installations in University Residence Halls, 2012 ACEEE Summer Study on Energy Efficiency in Buildings, 2012, pp. 298-311.

Yang et al., Development of multi-agent system for building energy and comfort management based on occupant behaviors, Energy and Buildings 56: 1-7. Elsevier Sequoia S.A., Jan. 2013, Abstract only, 3 pages.

International Search Report and Written Opinion of the International Searching Authority for PCT/US2015/026932, dated Jul. 15, 2015.

English Machine Translation for KR1020140047851, Apr. 23, 2014.

English Machine Translation for KR1020130107838. Oct. 2, 2013.

Supplementary European Search Report for EP Application No. 15786321, dated Nov. 10, 2017 (3 pp.).

\* cited by examiner

CONTROLLING A BUILDING SYSTEM BASED ON REAL TIME EVENTS

BACKGROUND

Keeping a furnace of a building operating at a level high enough to make residents comfortable when there are no occupants in the home can be costly and wasteful. Likewise, keeping lights on when they are not in use also wastes resources and is an additional cost to homeowners and/or building management. Thus, residents in a home turn down the lights and/or lower the temperature in their homes when they leave for an extended amount of time to save costs. For example, if a homeowner takes a week-long vacation, the homeowner often manually adjusts the thermostat to keep the home at a temperature that will prevent the house from freezing or overheating while the homeowner is away. But, such a temperature may not necessarily be a temperature that is comfortable for the homeowner. Thus, when the homeowner returns, the homeowner must readjust the thermostat to return the house to a comfortable temperature.

SUMMARY

Methods and systems are described for controlling parameters in a building. According to at least one embodiment, a method for controlling a building system includes using at least one sensor to detect occupancy in a building over time, determining a predictive schedule based on the occupancy detected with the at least one sensor, and associating real time events that occur simultaneously with an occupancy state of the predictive schedule.

In some embodiments, the method further includes deducing an unoccupied state of the building. In some cases, deducing the unoccupied state of the building includes sensing a door event. In other examples, deducing the unoccupied state of the building includes a lack of stimulus to the at least one sensor. In some situations, deducing the unoccupied state of the building is based at least in part on the predictive schedule.

In some instances, the method further includes determining with an increased confidence that the deduced unoccupied state is accurate in response to a simultaneous occurrence of the real time event. Further, the method may include adjusting a building parameter based on the increased confidence of the unoccupied state. Such a building parameter may include a climate parameter, a lighting parameter, a security parameter, another type of parameter, or combinations thereof.

Additionally, the method may include predicting a transition time from the unoccupied state to an occupied state based on a simultaneous occurrence of the real time event. The real time event may be detected with a location device incorporated into a mobile device. For example, the real time event may include a location device being in a specific location, a location device heading in a specific direction, a location device heading in a specific direction from a specific location, other real time events, or combinations thereof.

In another aspect of the principles described herein, a computing device is configured for controlling a building system. The computing device includes a processor, memory in electronic communication with the processor, and instructions stored in the memory. The instructions are executable by the processor to use at least one sensor to detect occupancy in a building over time, determine a predictive schedule based on the occupancy detected with the at least one sensor, and associate real time events that occur simultaneously with an occupancy state of the predictive schedule.

In yet another aspect of the principles described herein, a computer program product is used for controlling a building system. The computer-program product includes a non-transitory computer-readable medium having instructions thereon. The instructions are executable by a processor to use a first sensor type to use at least one sensor to detect occupancy in a building over time, determine a predictive schedule based on the occupancy detected with the at least one sensor, identify real time events that occur simultaneously with an occupancy state of the predictive schedule, deduce an unoccupied state of the building, determine with an increased confidence that the deduced unoccupied state is accurate based on a simultaneous occurrence of the real time event, and adjust a building parameter in response to determining the increased confidence of the unoccupied state.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
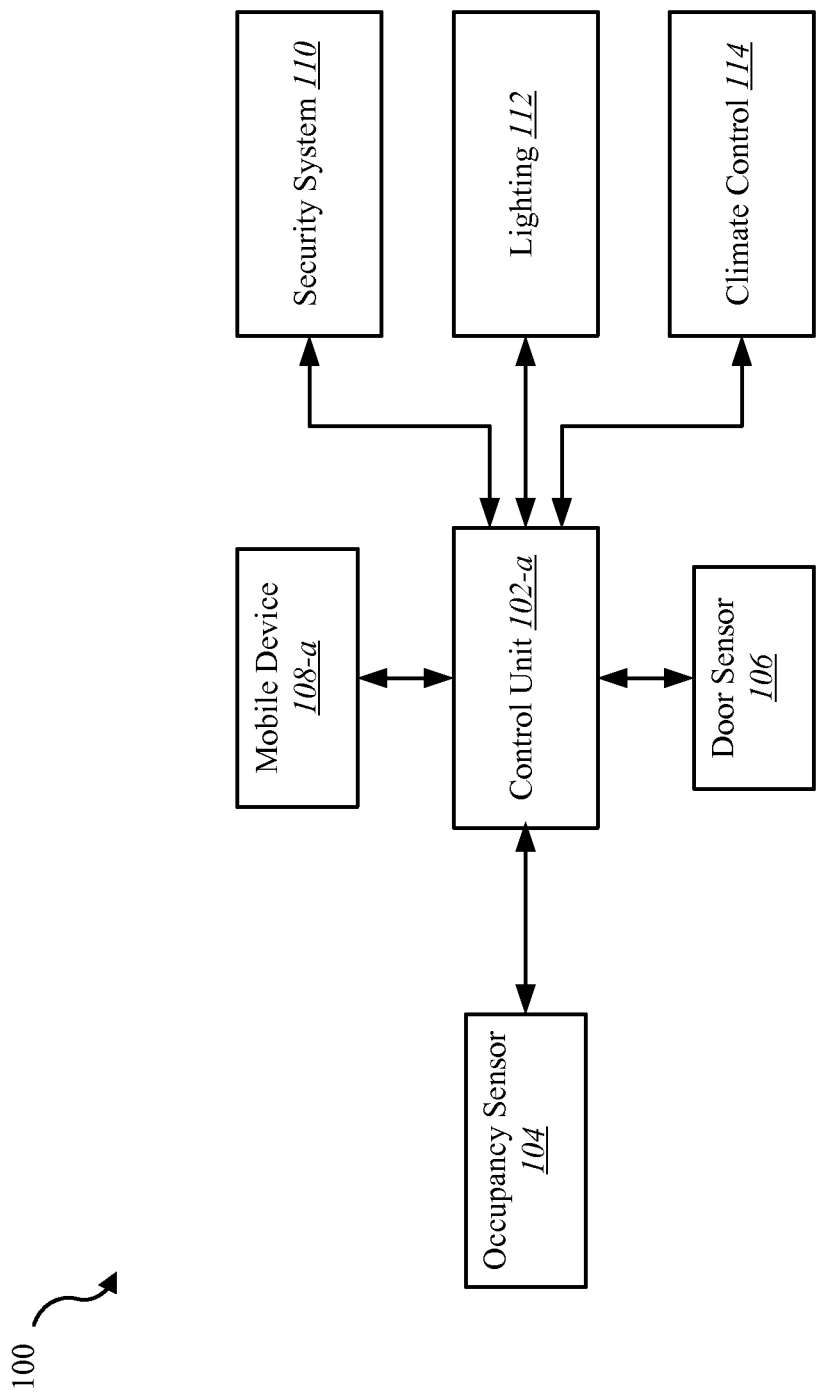
FIG. 1 is a block diagram of an example of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation, home security and related security systems and automation for use in commercial and business settings. More specifically, the systems and methods described herein relate to an improved arrangement for controlling parameters in a building. The principles described herein use occupancy sensors to predict a schedule of when the building is occupied. The parameters in the building are adjusted based in part on the schedule. The parameters can also be changed in response to deducing that the building is unoccupied and determining a simultaneously occurrence of a real time event that correlates with an increased probability that the building is unoccupied.

As used herein, the term "module" includes a combination of hardware and programmed instructions that are necessary for performing the designated function of the module. Components of the modules may be located on the same physical device or some of the components may be located at remote locations that are in communication with the other components of the module.

FIG. 1 is a block diagram depicting one embodiment of an environment 100 in which the present systems and methods may be implemented. In some embodiments, the environment 100 includes a control unit 102-a that is in communication with at least one occupancy sensor 104, a door sensor 106, and a mobile device 108-a. The control unit 102-a is also in communication with a security system 110, lighting 112, and a climate control 114.

Any appropriate mechanism for communicating between the control unit 102-a, the occupancy sensors 104, the door sensor 106, and the mobile device 108-a may be used. In some examples, a wireless network is utilized to communicate between the control unit 102-a, the occupancy sensors 104, the door sensor 106, and the mobile device 108-a. Examples of networks that may be used include, but are not limited to, local area networks (LAN), wide area networks (WAN), virtual private networks (VPN), wireless networks (using 802.11, for example), and/or cellular networks (using 3G and/or LTE, for example), Bluetooth networks, z-wave networks, ZigBee networks, other types of networks, or combinations thereof.

The control unit 102-a may control at least a part of the security and/or automation system. For example, other sensors and/or actuators may send information to the control unit 102-a where the signals are processed. Such sensors may include, for example, a camera sensor, audio sensor, forced entry sensor, shock sensor, proximity sensor, boundary sensor, appliance sensor, light fixture sensor, temperature sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, heartbeat sensor, breathing sensor, oxygen sensor, carbon dioxide sensor, brain wave sensor, movement sensor, voice sensor, other types of sensors, or combinations thereof. Such actuators may include, but are not limited to, automated door locks, climate control adjustors, lighting adjusters, sensors activation mechanisms, other types of actuators, or combinations thereof.

The control unit 102-a may make decisions based on the communications from the occupancy sensor 104 and the door sensor 106. For example, based on the information sent from the occupancy sensor 104 and the door sensor 106 to the control unit 102-a, the control unit 102-a may make a decision to activate an alarm, adjust a climate control setting, open or close a window, lock or unlock a door, control a security parameter, manage energy consumption, check the status of a door, locate a person or item, control lighting, control cameras, receive notifications regarding a current status or anomaly associated with a building, perform another task, or combinations thereof. In some cases, a decision may be decided at one of the local sensors, and the local sensors may or may not notify the control unit 102-a of the decision and/or resulting action.

In some examples, the control unit 102-a includes a user interface where the occupant can interact with the control unit 102-a. For example, the occupant can manually give instructions to the control unit 102-a to adjust a building parameter, install an occupancy sensor 104, or perform another system task.

In addition to the capabilities mentioned above, the control unit 102-a may determine whether the building is occupied or unoccupied. In some examples, the occupancy sensor 104 communicates with the control unit 102-a to determine the occupancy state of the building. Any appropriate type or types of occupancy sensors may be used in accordance with the principles described in the present disclosure. A non-exhaustive list of occupancy sensor types may include microphones, motion detectors, video cameras, mobile devices, location devices, infrared devices, temperature devices, touch input devices, other types of devices, or combinations thereof. In some examples, a single occupancy sensor 104 is used to determine whether the entire building is occupied. However, in other examples, multiple occupancy sensors 104 are distributed throughout the building to determine whether the building is occupied. In some cases, multiple different types of occupancy sensors 104 are used to increase the reliability of occupancy detection.

In an example where a motion detector is used, the control unit 102-a may determine that the building is not occupied when the motion detector does not detect the presence of an occupant within the building. On the other hand, the control unit 102-a may determine that there is an occupant within the building when the motion detector is triggered.

In addition to the occupancy sensor 104, the door sensor 106 or a window sensor may indicate to the control unit 102-a when an event occurs that may indicate a change in occupancy. For example, a probability exists that the building's occupancy state will change when a door to the exterior of the building is open allowing occupants to enter and/or leave the building. In response to the occurrence of such a door type event, the control unit 102-a is aware that the occupancy of the building may have changed. In response to such a door type event, the control unit 102-a may associate a time stamp with the opening and/or closing of the door. The control unit 102-a may make an assumption that occupancy will be consistent until the occurrence of another door type event. As time progresses from the occurrence of the event, a motion detector (or another type of occupancy sensor) may detect the presence of an occupant. As a result, the control unit 102-a may determine that the building will be occupied until the occurrence of another door type event. Likewise, if the motion detector (or another type of occupancy sensor) does not detect an occupant, the control unit 102-a may determine that no occupants are within the building and determine that the building will be unoccupied until a subsequent door type event.

The subsequent door type event may be of the same type of event as the initial door type event. For example, the initial door type event and the subsequent door type event may both be opening the front door to a home. In other examples, the initial door type event is opening a front door, and the subsequent door type event is the opening of a back door. In yet other examples, the initial door type event may be opening a door, and the subsequent door type event may be the opening of a window, the opening of a garage door, another type of event that may indicate a potential change in occupancy, or combinations thereof. While these examples have been described with reference to specific types of events, any appropriate type of event of may be used for either of the initial door type event and the subsequent door type event that can indicate a potential change in occupancy.

In some examples, the control unit 102-a determines that there is occupancy or no occupancy after a predetermined time threshold lapses from the occurrence of the event. In other examples, the control unit 102-a calculates an increased confidence that there is no occupancy within the building as the time progresses from the occurrence of the event.

The control unit 102-a or another type of processing device may generate a schedule based on the data collected from the occupancy sensor 104. For example, the occupancy sensors 104 in a household of a single individual who leaves his or her home around 7:45 a.m. and returns home around 5:15 p.m. may have fairly consistent occupancy patterns Monday through Friday. In such an example, the occupancy sensors may fail to detect the presence of the individual during the time period that starts around 7:45 a.m. and ends around 5:15 p.m. Based on such consistent measurements over time, the control unit 102-a may predict that the household will be unoccupied during this time period. As a result, when a door type event occurs around 7:45 a.m. on a week day, the control unit 102-a may determine that the home will be unoccupied until about 5:15 p.m.

Such a generated schedule may vary from day to day. For example, the control unit 102-a may have the capability to determine patterns for each day of the week to account for different schedules on different days of the week. Similarly, the control unit 102-a may have a capability to recognize weekly patterns, monthly patterns, annual patterns, patterns exhibited over less than a week, patterns exhibited over less than a day, other patterns, or combinations thereof.

The occupancy sensors may be positioned throughout an entire building. In other examples, the occupancy sensors are positioned just within areas that are highly indicative of occupancy throughout the entire building.

The predictive schedule may be used, at least in part, to make adjustments to parameters of the building. For example, if the control unit 102-a receives notice that a door type event has occurred, the control unit 102-a can consult the predictive schedule. If the door type event coincides with a predicted transition into an unoccupied state, the control unit 102-a may determine that the building is not occupied. In some examples, the control unit 102-a may continue to monitor the building with occupancy sensors 104 for a predetermined grace period before making the determination that the building is unoccupied.

If the predictive schedule also predicts that the building will be unoccupied for a sufficient period of time, the control unit 102-a may send commands to various control devices throughout the building to adjust parameters to conserve building resources while the building is unoccupied. For example, the control unit 102-a may communicate with lighting 112 and a climate control 114 to reduce energy consumption. Similarly, the control unit 102-a may automatically arm the security system 110 in response to determining that the building is unoccupied. In some examples, appliances like a washing machine may be turned on based on the determination that the building is in an unoccupied state, while other devices, like a television or a radio, may be turned off. While just a few specific parameters are described as being adjusted based on the determination of the building being in an unoccupied state, any appropriate parameter adjustment may be made including adjustments to security parameters, climate parameters, lighting parameters, cleaning parameters, energy consumption parameters, computer parameters, television parameters, door parameters, window parameters, blind parameters, fan parameters, appliance parameters, water parameters, network parameters, other types of parameters, or combinations thereof.

The control unit 102-a may also identify and associate real time events that correlate with different types of occupancy states predicted in the predictive schedule. In some examples, the predictive schedule has an occupied state and an unoccupied state. During the unoccupied state, a location device in the mobile device 108-a that is carried by a building occupant may indicate that the occupant is at a specific location remote to the building. Over time, there may be a strong correlation between the mobile device 108-a being at that specific location and the building being in an unoccupied state. In such an situation, the control unit 102-a may associate the mobile device's presence at that specific location with an unoccupied state of the building.

For example, if the predictive schedule indicates that an occupant generally leaves his or her home about 5:15 a.m., when a door type event occurs at 5:15 a.m., the control unit 102-a may have some degree of confidence that the building is unoccupied after the door type event occurs. However, such a level of confidence may not be high enough for the control unit 102-a to start making adjustment to the building's parameters just in case the building is actually still occupied. To increase the confidence level that the building is unoccupied, the control unit 102-a may wait for a predetermined time period before making parameter adjustments. After such a predetermined time period, if no occupants are detected, the system's confidence that the building is unoccupied increases. With the increased confidence, the control unit 102-a may cause the building's parameters to be adjusted to reflect that the building is unoccupied. Thus, in keeping with the above example, the building's parameters will be changed at 5:45 a.m.

As an example, a predetermined time period to increase the control unit's confidence that the building is unoccupied may be thirty minutes. In such an example where the occupant leaves for work at 5:15 a.m., the building's parameters will be unadjusted for at least those additional thirty minutes from when the occupant leaves the building. However, if the occupant arrives at a real time event location, such as the occupant's place of work, at 5:20 a.m., the control unit 102-a may recognize the real time event based on the location of the occupant's mobile device. The recognition of such a real time event may provide the control unit 102-*a* with the increased confidence that the building is unoccupied. Thus, the control unit 102-*a* may cause the parameters in the building to be adjusted at 5:20 a.m. instead of 5:45 a.m. Thus, more resources can be conserved.

In another example, the control unit 102-*a* may associate an increased confidence that the building will be unoccupied when the mobile device is heading in the direction to work, not just merely being at the occupant's location of work. Thus, if the control unit 102-*a* determines, based on the route exhibited by the mobile device 108-*a*, that the occupant is headed towards work, the control unit 102-*a* may have a higher degree of confidence that the building will remain unoccupied as indicated in the schedule.

In other examples, the predictive schedule may indicate that the building is to be occupied. However, the mobile device's location and/or direction may exhibit a real time event that is so strongly correlated with the building being unoccupied for a specified period of time that the control unit 102-*a* has an increased confidence that the building is unoccupied. Thus, if the occupancy sensor 104 is not indicating otherwise, the control unit 102-*a* may determine, with an increased confidence, that the building is unoccupied, and therefore adjust the parameters of the building accordingly.

In some situations, not all of the real time events will be associated with the same level of confidence. For example, real time events that indicate that the occupant is at work may generate an increased confidence while other real time events that indicate that the occupant is at a certain store or in the neighborhood may be associated with a lower level of confidence.

Figure 2:
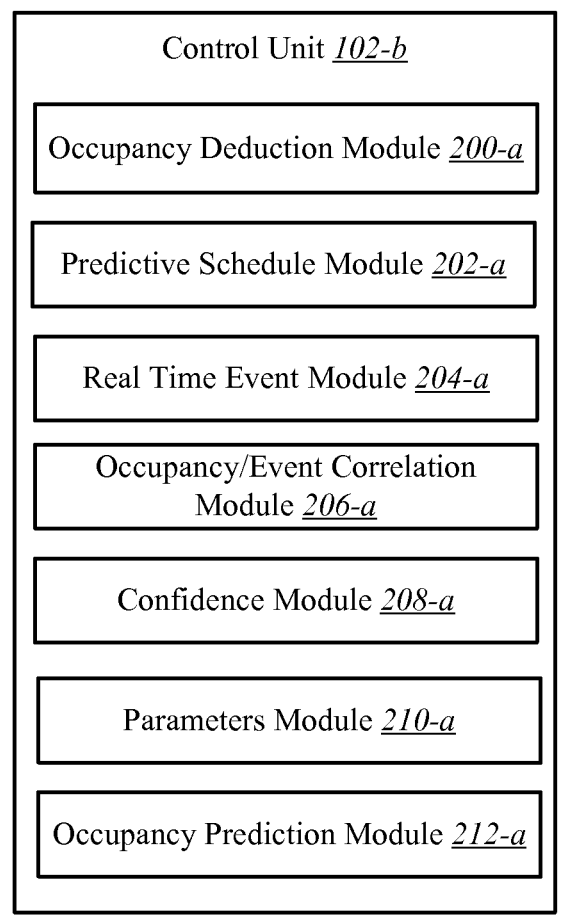
FIG. 2 is a block diagram of an example of a control unit of the environment shown in FIG. 1.

FIG. 2 is a block diagram illustrating one example of a control unit 102-*b*. In this example, the control unit 102-*b* has an occupancy deduction module 200-*a*, a predictive schedule module 202-*a*, a real time event module 204-*a*, an occupancy/event correlation module 206-*a*, a confidence module 208-*a*, a parameters module 210-*a*, and an occupancy prediction module 212-*a*.

The occupancy deduction module 200-*a* may be used to deduce whether a building is occupied or not. For example, if the occupancy sensor 104 detects the presence of a person, the occupancy deduction module 200-*a* may deduce that the building is currently in an occupied state. On the other hand, if the occupancy sensor 104 does not detect the presence of an occupant, the occupancy deduction module 200-*a* may deduce that the building is in an unoccupied state. However, in either state, the occupancy deduction module 200-*a* may have varying degrees of confidence about the deduced state.

The predictive schedule module 202-*a* may generate and/or maintain a schedule that predicts when the building will be occupied or unoccupied. Such a predictive schedule may be based on the historical occupancy patterns recorded over time with the occupancy sensors 104. The predictive schedule may include schedules that are unique for each day of the week, month, year, other time periods, or combinations thereof. The predictive schedule can be stored remotely or locally at the control unit 102-*b*. Further, the predictive schedule module 202-*a* can modify the predictive schedule over time as more occupancy data is gathered. In some examples, the predictive schedule module 202-*a* initially begins with a default schedule. In other examples, the predictive schedule module 202-*a* builds the predictive schedule from scratch based on the determined occupancy patterns.

In some examples, the predictive schedule has just an occupied state and an unoccupied state. In other examples, the predictive schedule includes additional occupancy states that give more detail about the occupant's behavior, such as an "on the way to work" state, an "at work" state, a "heading home from work" state, another type of state, or combinations thereof. The additional occupancy states may help the control module understand when the building is likely to be reoccupied.

The real time event module 204-*a* may determine which real time events correspond to different occupancy states based on the predictive schedule. For example, the real time event module 204-*a* may determine that there is a high correlation that when the mobile device 108 is at the location of the occupant's work, that the building is unoccupied. Likewise, other locations of the mobile device 108 may also have a strong correlation with the building being unoccupied. Further, when the mobile device is heading in the direction to such locations, there may be a strong correlation with the building being unoccupied.

The real time events may also include the directions that are not necessarily tied to specific locations. For example, if the occupant is leaving work and heads in a direction that is going away from his or her home, there may be a strong correction that the occupant is going to a gym, a sports event, out to dinner, or another type of activity that suggests that the building will continue to stay unoccupied for an additional predictable amount of time.

The real time events may include more than just the location of the mobile device 108 or the direction that the mobile device 108 is headed. For example, a non-exhaustive list of potential real time events that may correlate with the building's occupancy state may include the duration that a door is left open, the presence of a pet or valuable possession within the home, whether the mobile device is turned on, a particular application is being run on the mobile device, the occurrence of a particular community event, the occurrence of a particular television show, a health condition of the occupant, another type of real time event, or combinations thereof.

In some examples, more than one occupant resides in a home. In such a situation, more than one mobile device 108-*a* may include a location device that is in communication with the control unit 102-*b*. In such situations, the real time events may include the simultaneous locations of more than one mobile device 108, a direction of one mobile device and a location of another mobile device, the directions of multiple mobile devices, the location and/or direction of a predominate mobile device, other complex relationships between the multiple mobile devices, or combinations thereof.

The occupancy/event correlation module 206-*a* determines which of the real time events correlate with a particular occupancy state of the building. In some examples, the occupancy/event correlation module 206-*a* also determines the amount of time that the building is likely to be within the correlated occupancy state based on the real time event. For example, real time events that indicate that the occupant is going to or is at work may be associated with a nine hour period of non-occupancy for the building. Likewise, a real time event that indicates that the occupant is sick may correlate to the occupant being home all day. In such a situation, a heart rate monitor or another type of physiological sensor may be used to determine the health condition of the occupant. Further, the strength of the correlation between the real time event and the occupancy state may vary.

The confidence module 208-*a* determines a confidence that the building is in the deduced state. For example, if the occupancy sensor is detecting that an occupant is in the building, the confidence module can have a high confidence that the building is occupied. In another situation, if the predictive schedule indicates that the building is unoccupied and the occupancy sensor 104 does not detect the presence of an occupant, the confidence module 208-a may have a certain level of confidence that the building is unoccupied. However, if a real time event that correlates with the unoccupied state additionally occurs simultaneously with the lack of occupancy detection and the predictive schedule, the confidence module 208-a can have an even greater confidence that the building is unoccupied.

The parameters module 210-a adjusts parameters in the building based on the predictive schedule, the readings of the occupancy sensor 104, and the confidence module 208-a. For example, the parameters module 210-a can adjust lighting parameters, climate parameters, security parameters, other parameters in the building, and so forth based on the predictive schedule. The control unit 102-b continues to monitor the building for occupancy. So, even if the predictive schedule indicates that historically no occupant is in the building, but the occupancy sensors are detecting an occupant, the parameters module 210-a can refrain from adjusting parameters to conservation levels. In other words, the real time occupancy detection can override the predictive schedule and also the detection of real time events. The parameters module 210-a may include a policy that it is better to conclude that there is an occupant in the building and risk wasting some energy resources when the building is not occupied than to conclude that the building is unoccupied when the building is actually occupied and thereby risk subjecting that occupant to the effects of running the building's systems at conservation levels.

The occupancy prediction module 212-a predicts when the building will change from an unoccupied state to an occupied state. For example, if the predictive schedule indicates that the building will be unoccupied on a certain day of the week until 5:00 p.m., the occupancy prediction module 212-a predicts that the occupancy state will change to an occupied state at 5:00 p.m. In such an example, the occupancy prediction module 212-a communicates with the parameters module 210-a to determine when to adjust the various parameters of the building for the occupancy state. In some cases, the parameters module 210-a may begin to adjust heating and cooling parameters at a predetermined time period before the occupancy state changes while other parameters, such as security and lighting parameters, may not be adjusted until the building is actually occupied.

The occupancy prediction module 212-a may also use real time events to adjust the anticipated arrival time of an occupant and therefore the predicted time when the occupancy state will change. For example, a real time event may be that the occupant heads away from his location of employment in a different direction than towards his or her home. Such a real time event may have a strong correlation with the occupancy state transition being delayed by an hour or another time period. Thus, the occupancy prediction module 212-a may predict that the transition time will be an hour later on those days when the occupant heads home in the different direction. In another example, a real time event may include that the occupant is leaving work early. Such a real time event may have a high correlation with the occupant being home within a specific time period after leaving from the location of his work.

Figure 3:
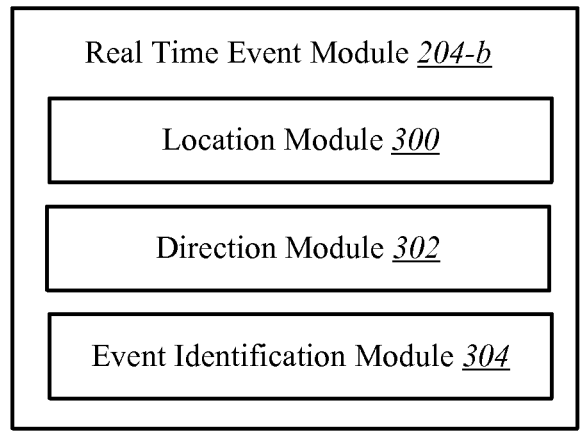
FIG. 3 is a block diagram of an example of an real time event module of the control unit of FIG. 2.

FIG. 3 is a block diagram illustrating an example of a real time event module 204-b. In this example, the real time event module 204-b has a location module 300, a direction module 302, and an event identification module 304.

The location module 300 identifies those locations where the occupant is location based on the input from the mobile device 108. The locations are compared to occupancy states of the building. For those locations that have a high correlation with a specific occupancy state, the event identification module 304 can identify that such a location is a real time event.

The direction module 302 identifies those directions that the occupant is headed to identify patterns. If such patterns are identified, the patterns can be compared to the predictive schedule to determine if such a direction correlates with a particular occupancy state. Further, such determinations may correlate with a specific pattern anomaly, such as the occupant arriving at the building an hour later when the occupant heads in a particular direction. The direction may also be correlated with locations and times of day.

The event identification module 304 identifies those real time events that have a high correlation with occupancy states, schedule anomalies, or other types of attributes of the predictive schedule. The event identification module 304 may determine the correlation between the attributes of the predictive schedule and any type of real time event. For example, the readings from non-occupancy sensors, readings from the mobile device, readings from health monitoring sensors, readings from calendar appointments, other types of readings that indicate a real time event, or combinations thereof.

The event identification module 304 can also assign different confidence levels to the real time events. For example, those real time events with lower correlations to aspects of the predictive schedule may not receive the same confidence level as those real time events that are strongly correlated with certain aspects of the predictive schedule.

Figure 4:
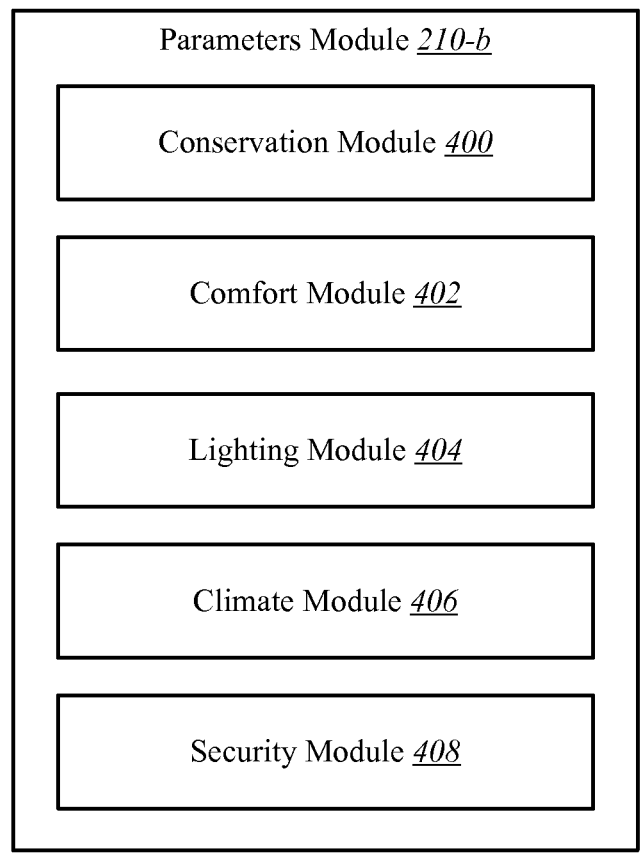
FIG. 4 is a block diagram of an example of a parameters module of the control unit of FIG. 2.

FIG. 4 is a block diagram illustrating one example of a parameters module 210-b. In this example, the parameters module 210-b includes a conservation module 400, a comfort module 402, a lighting module 404, a climate module 406, and a security module 408.

The conservation module 400 may cause at least one parameter affecting the building to change based on the predictive schedule. For example, the conservation module 400 may cause the furnace to lower its output to conserve energy while the building is unoccupied. When there is a sufficiently high enough confidence level that the building is unoccupied, the conservation module 400 may cause the furnace's parameters to be changed to lower the building's temperature to a level that conserves the building's resources.

In response to detecting a door type event, a sensor associated with the door type event, sends a message to the control unit 102. In response to the receipt of such a message, the control unit 102 may track the passage of time from the occurrence of the event to gain confidence that the building is unoccupied. However, if a real time event is detected that has a correlation with an unoccupied state, then the parameters module 210-b may determine sooner that the building is unoccupied without waiting through the predetermined time lapse.

The conservation module 400 may be in communication with any appropriate module. For example, the conservation module 400 may be in communication with the lighting module 404 that controls at least some of the lighting in the building, the climate module 406 that controls at least some of the mechanisms that affect the building's climate, the security module 410 that controls how the premise of the building is monitored for security purposes, other modules, or combinations thereof.

The comfort module 402 may cause parameters affecting the building to change in response to predicting that the building will be occupied. The comfort module 402 may consult with the predictive schedule to determine when the building is predicted to be occupied. In some examples, the parameters are changed prior to the predicted occupancy time so that parameters that take time to achieve can begin to change early enough so that the comfort level is achieved by the time that the occupants arrive. For example, a furnace may take twenty minutes to raise the temperature of a home from the conservation level to a comfort level. In such an example, if the predicted occupancy time is 5:00 p.m., the comfort module 402 may initiate the parameter changes at 4:40 p.m. so that the building is heated to the comfort level at 5:00 p.m.

Similar to the conservation module 400, the comfort module 402 may be in communication with the lighting module 404, the climate module 406, the security module 408, other modules, or combinations thereof. The comfort module 402 may cause the parameters of the building to be such that the occupant's environment within the building is comfortable.

Figure 5:
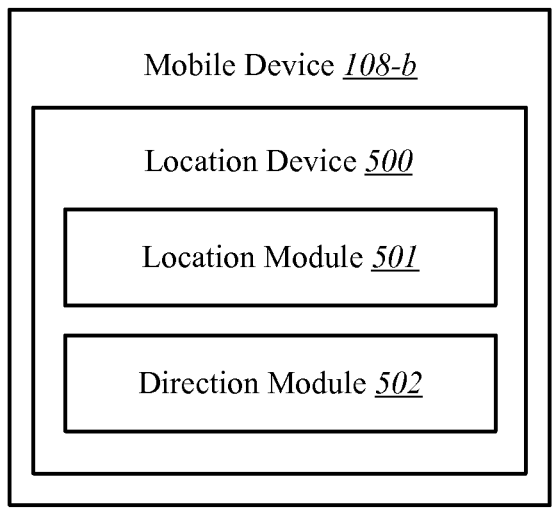
FIG. 5 is a block diagram of an example of a mobile device of the environment of FIG. 1.

FIG. 5 is a block diagram illustrating one example of a mobile device 108-*b*. In this example, the mobile device 108-*b* includes a location device 500 with a location module 501 and a direction module 502.

In this illustrated example, the location and the direction of the mobile device 108-*b* are determined with the location device 500 of the mobile device 108-*b* and sent to the control unit 102. Any appropriate type of mobile device 108-*b* may be used. For example, the mobile device 108-*b* may include a phone, an electronic tablet, a watch, a laptop, a digital device, glasses, a pedometer, a wearable computing device, a vehicle mounted device, another type of device, or combinations thereof. Further, any appropriate type of location device 500 may be used in accordance with the principles described in the present disclosure. For example, the location device 500 may include a global positioning system (GPS), a navigation mechanism, an accelerometer, magnetic field sensor, a compass, another type of locating device, or combinations thereof.

Figure 6:
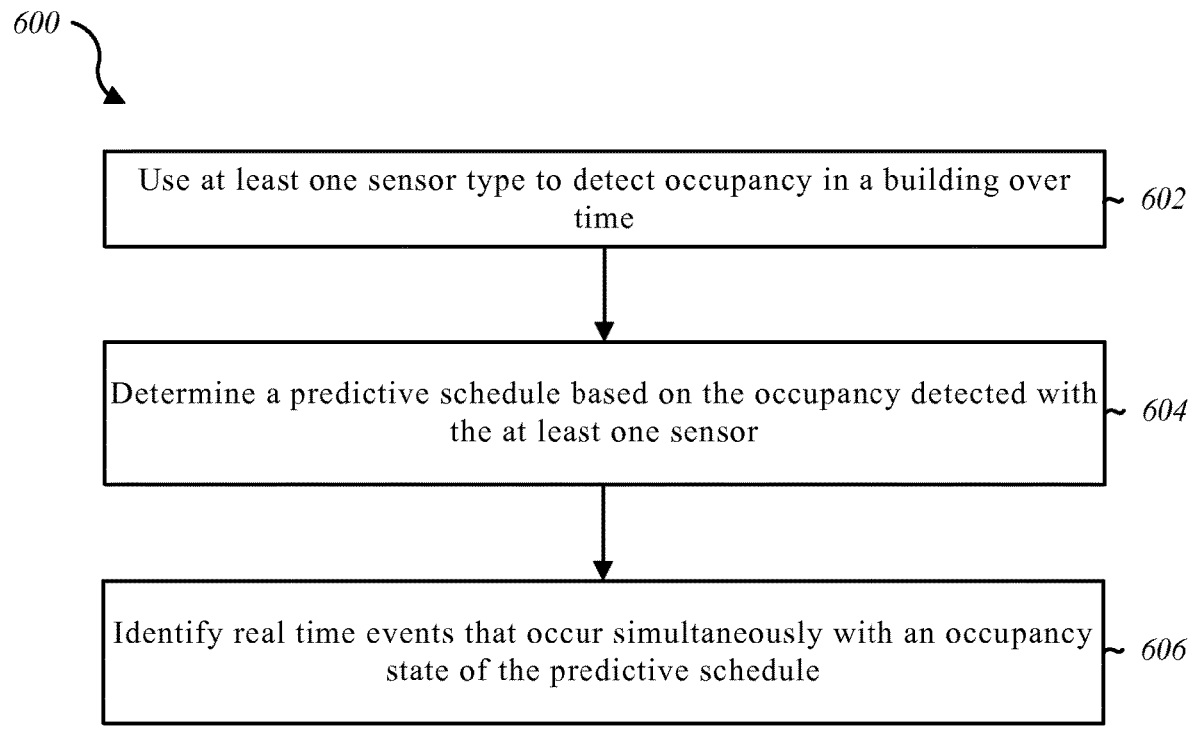
FIG. 6 is a flow diagram illustrating an example of a method for controlling a building system.

FIG. 6 is a flow diagram illustrating one embodiment of a method 600 for controlling a building system. In this example, the method 600 includes using 602 at least one sensor type to detect occupancy in a building over time, determine 604 a predictive schedule based on the occupancy detected with the at least one sensor, and identify 606 real time events that occur simultaneously with an occupancy state of the predictive schedule. Such a method 600 may be implemented with a control unit 102 shown in FIGS. 1 and/or 2. In other examples, method 600 may be performed generally by the environment 100 shown in FIG. 1.

At block 602, occupancy sensors are used to determine whether the building is occupied or unoccupied. Such a sensor type may be any appropriate type of sensor that is capable of determining whether an occupant is present within the building. For example, a motion detector, video camera, microphone, thermometer, door sensor, window sensor, another type of sensor, or combinations thereof may be used to detect the presence of an occupant.

At block 604, the predictive schedule is determined based on the occupancy patterns detected in the building over time. Such a schedule predicts when the building will be occupied and/or unoccupied.

At block 606, real time events are identified that have a correlation with an occupancy state of the building according to the predictive schedule. Such real time events can provide the control unit 102 an additional amount of confidence that the building is in a deduced state when both the deduced state and the real time event occur simultaneously.

Figure 7:
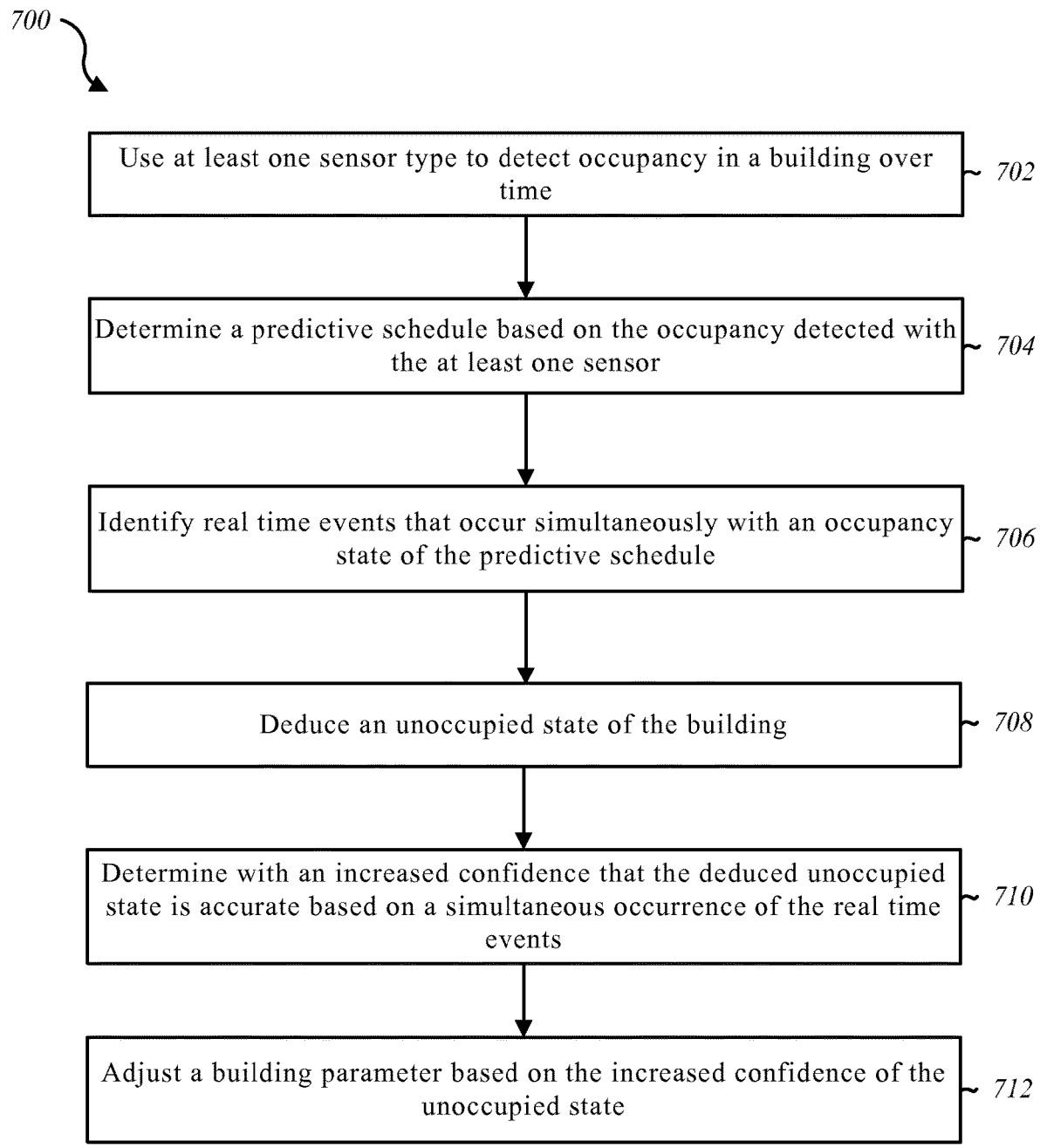
FIG. 7 is a flow diagram illustrating an example of a method for controlling a building system.

FIG. 7 is a flow diagram illustrating one embodiment of a method 700 for controlling a building system. In this example, the method 700 includes using 702 at least one sensor type to detect occupancy in a building over time, determining 704 a predictive schedule based on the occupancy detected with the at least one sensor, identifying 706 real time events that occur simultaneously with an occupancy state of the predictive schedule, deducing 708 an unoccupied state of the building, determining 710 with an increased confidence that the deduced unoccupied state is accurate based on a simultaneous occurrence of the real time events, and adjusting 712 a building parameter based on the increased confidence of the unoccupied state. Such a method 700 may be implemented with a control unit 102 shown in FIGS. 1 and/or 2. In other examples, method 700 may be performed generally by the environment 100 shown in FIG. 1.

At block 708, the occupancy state of the building is deduced. The occupancy state of the building may be determined with readings from the occupancy sensors and/or the predictive schedule. For example, if none of the occupancy sensors detects the presence of an individual, then an unoccupied state may be deduced.

At block 710, an increased confidence that the building is in the unoccupied state is determined based on the detection of a real time event. Historically, such a real time event may strongly correlate with unoccupied states. Thus, the control unit 102 can determine with a greater degree of confidence that the deduced unoccupied state is correct.

At block 712, the parameters of the building are adjusted to a conservation level in response to the simultaneous occurrence of the deduced state and the detection of a real time event that historically confirms that unoccupied state.

Figure 8:
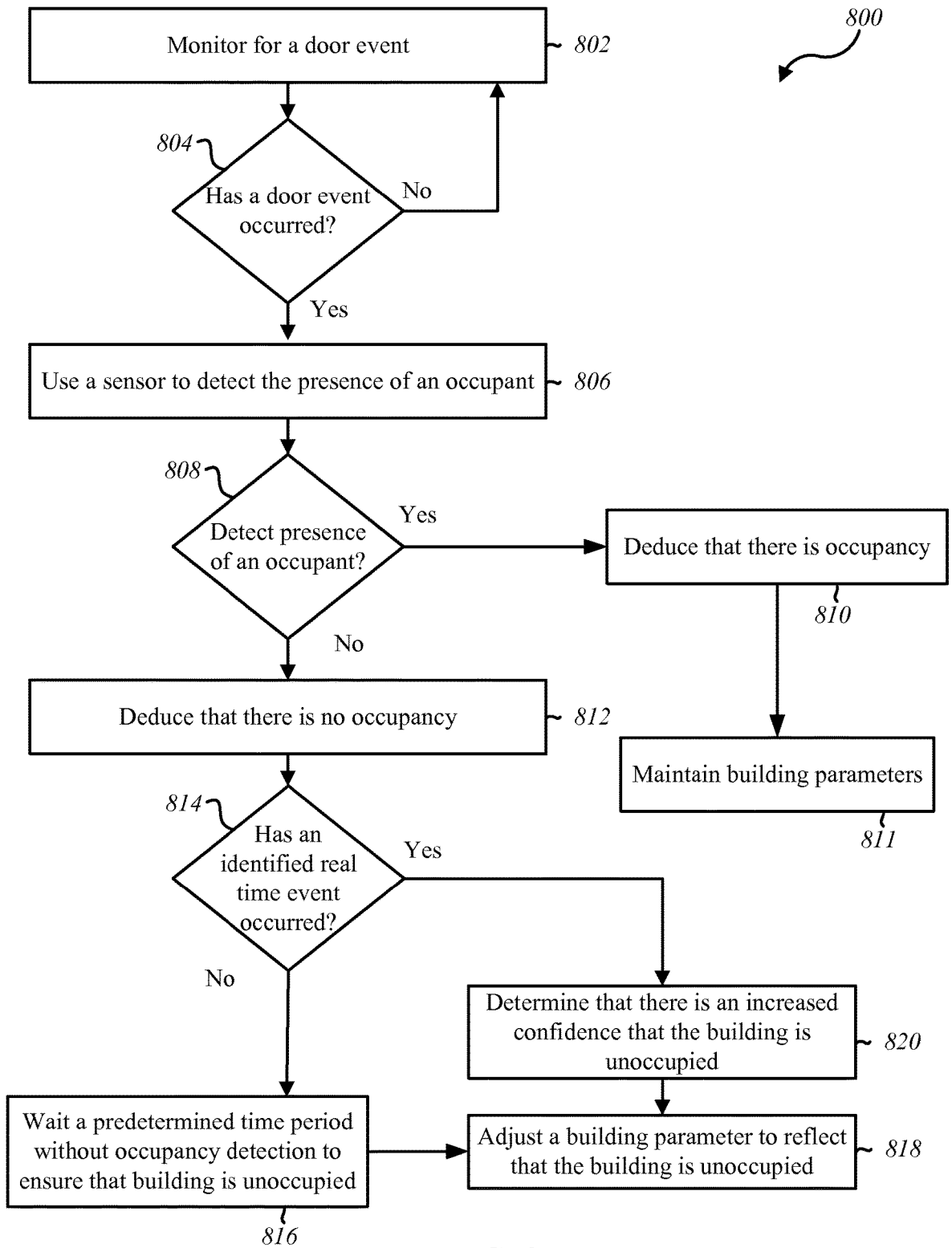
FIG. 8 is a flow diagram illustrating an example of a method for controlling a building system.

FIG. 8 is a flow diagram illustrating one embodiment of a method 800 for controlling a building system. Such a method 800 may be implemented with a control unit shown in FIGS. 1 and/or 2. In other examples, method 800 may be performed generally by the environment 100 shown in FIG. 1.

At block 802, a sensor monitors for door events, such as opening and closing the doors. At decision 804, a determination is made to whether a door event has occurred. If not, the method 800 includes continuing to monitor for a door event. On the other hand, if a door event has been detected, a sensor is used 806 to detect the presence of an occupant.

At decision 808, a determination is made as to whether the presence of an occupant has been detected. If the presence of an occupant is detected, then the method 800 includes deducing 810 that the building is occupied. In response to deducing that the building is not occupied, the building parameters are maintained 811. If there is no detection of an occupant, then the method 800 deduces 812 that the building is in an unoccupied state.

At decision 814, a determination is made about whether a real time event has been detected. If no real time event has been detected then the method 800 includes waiting 816 a predetermined time period without occupancy detection to ensure that the building is unoccupied. After the predetermined time period passes, the building parameters are adjusted 818 to reflect that the building is unoccupied. However, if a real time event is detected, the method 800 includes determining 820 with an increased confidence that the building is unoccupied and proceeding to adjust 818 the building's parameters.

Figure 9:
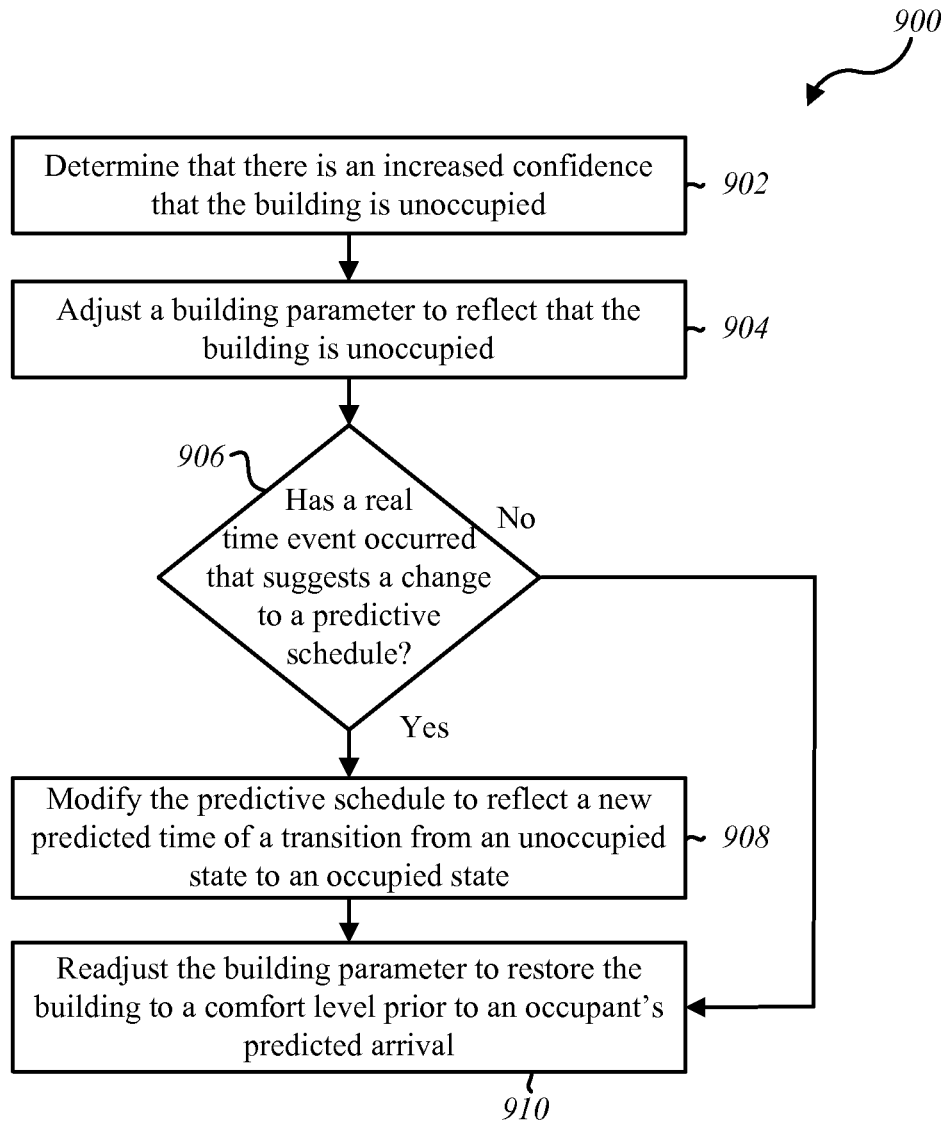
FIG. 9 is a flow diagram illustrating an example of a method for controlling a building system.

FIG. 9 is a flow diagram illustrating one embodiment of a method 900 for controlling a building system. Such a method 900 may be implemented with a control unit 102 in FIGS. 1 and/or 2. In other examples, method 900 may be performed generally by the environment 100 shown in FIG. 1.

At block 902, there is an increased confidence that the building is unoccupied. In response to determining 902 the increased confidence in the unoccupied state, a building parameter is adjusted 904 to reflect that the building is unoccupied. The method 900 further includes that determining 906 whether a real time event has occurred that suggests a change to a predictive schedule. If there has been such a real time event detected, the predictive schedule is modified 908 to reflect a new predicted time of a transition time from an unoccupied state to an occupied state. The building parameter is readjusted 910 to restore the building to a comfort level prior to an occupant's predicted arrival based on the modification.

Figure 10:
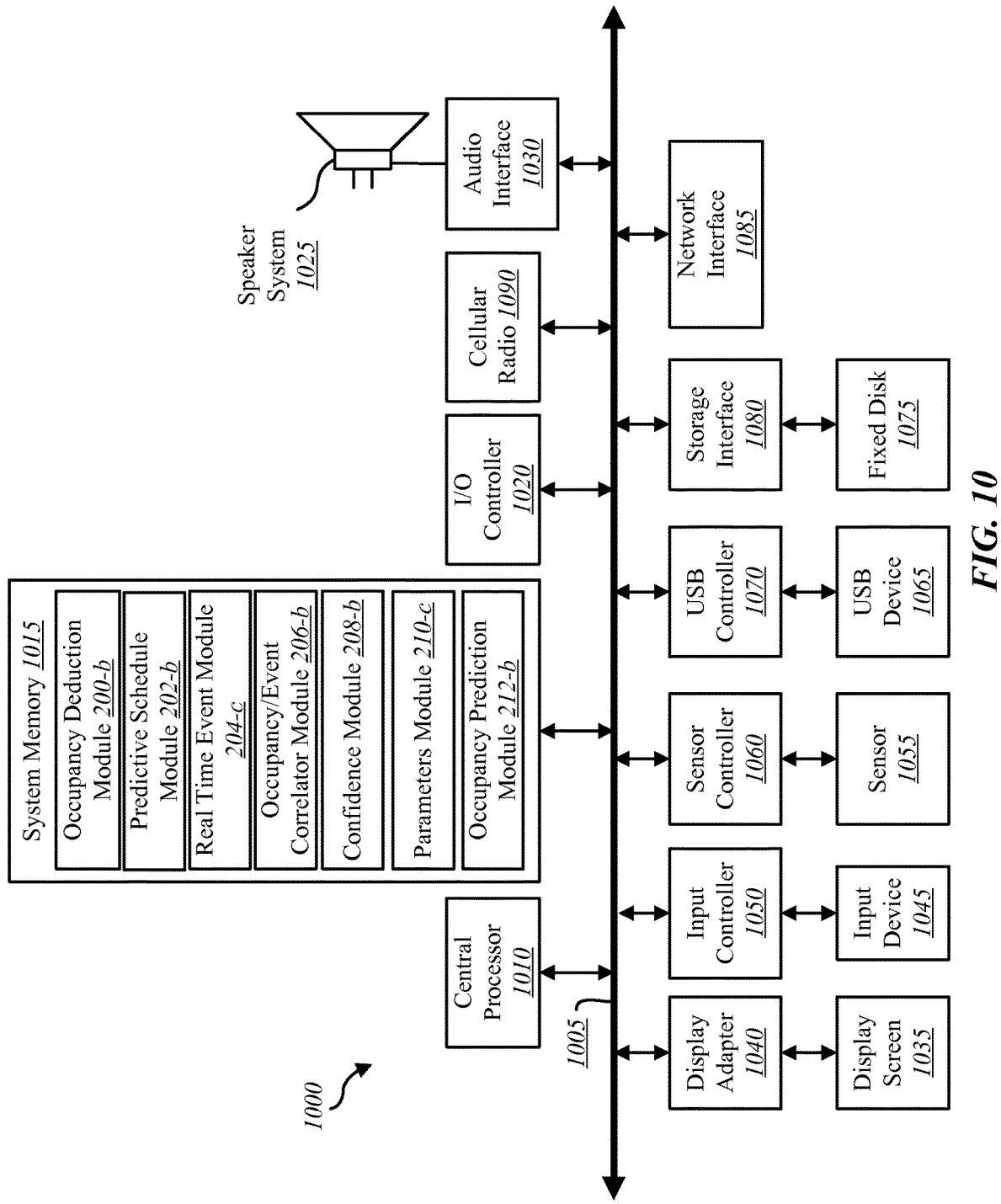
FIG. 10 is a block diagram of a computer system suitable for implementing the present systems and methods of FIG. 1.

FIG. 10 depicts a block diagram of a controller 1000 suitable for implementing the present systems and methods. The controller 1000 may be an example of the control unit 102-*a* in FIG. 1. In one configuration, controller 1000 includes a bus 1005 which interconnects major subsystems of controller 1000, such as a central processor 1010, a system memory 1015 (typically RAM, but which may also include ROM, flash RAM, or the like), an input/output controller 1020, an external audio device, such as a speaker system 1025 via an audio output interface 1030, an external device, such as a display screen 1035 via display adapter 1040, an input device 1045 (e.g., remote control device interfaced with an input controller 1050), multiple USB devices 1065 (interfaced with a USB controller 1070), one or more cellular radios 1090, and a storage interface 1080. Also included are at least one sensor 1055 connected to bus 1005 through a sensor controller 1060 and a network interface 1085 (coupled directly to bus 1005).

Bus 1005 allows data communication between central processor 1010 and system memory 1015, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, an occupancy deduction module 200-*b*, a predictive schedule module 202-*b*, a real time event module 204-*c*, an occupancy/event correlation module 206-*b*, a confidence module 208-*b*, a parameters module 210-*c*, and an occupancy prediction module 212-*b* may be used to implement the present systems and methods may be stored within the system memory 1015. These modules may be an example of the modules illustrated in FIG. 2. Applications resident with controller 1000 are generally stored on and accessed via a non-transitory computer readable medium, such as a hard disk drive (e.g., fixed disk 1075) or other storage medium. Additionally, applications can be in the form of electronic signals modulated in accordance with the application and data communication technology when accessed via network interface 1085.

Storage interface 1080, as with the other storage interfaces of controller 1000, can connect to a standard computer readable medium for storage and/or retrieval of information, such as a fixed disk drive 1075. Fixed disk drive 1075 may be a part of controller 1000 or may be separate and accessed through other interface systems. Network interface 1085 may provide a direct connection to a remote server via a direct network link to the Internet via a POP (point of presence). Network interface 1085 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1000 wirelessly via network interface 1085. In one configuration, the cellular radio 1090 may include a receiver and transmitter to wirelessly receive and transmit communications via, for example, a cellular network.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 10 need not be present to practice the present systems and methods. The devices and subsystems can be interconnected in different ways from that shown in FIG. 10. The aspect of some operations of a system such as that shown in FIG. 10 are readily known in the art and are not discussed in detail in this application. Code to implement the present disclosure can be stored in a non-transitory computer-readable medium such as one or more of system memory 1015 or fixed disk 1075. The operating system provided on controller 1000 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for controlling a building system, comprising:
   detecting a real time event at a building using at least one sensor associated with a user device, wherein detecting the real time event is based at least in part on a first directional movement of the user device;
   determining a confidence of an unoccupied state of the building based at least in part on a predictive schedule of unoccupied times of the building and detecting the real time event;
   increasing the confidence of the unoccupied state upon detecting an occurrence of a second real time event after a pre-determined period of time from the occurrence of the real time event, wherein the occurrence of the second real time event is based at least in part on a second directional movement of the user device different from the first directional movement;
   predicting a transition time from the unoccupied state to an occupied state based at least in part on a simultaneous occurrence of the real time event;
   overriding the predictive schedule of unoccupied times based at least in part on the confidence of the unoccupied state of the building exceeding a threshold value; and
   conserving resources associated with the building based at least in part on overriding the predictive schedule, wherein conserving the resources is based at least in part on adjusting parameters associated with controlling the building system.

2. The method of claim 1, wherein detecting the real time event comprises sensing a door event.

3. The method of claim 1, further comprising:
   deducing unoccupied state of the building based on determining a lack of stimulus to the at least one sensor during the pre-determined period of time.

4. The method of claim 1, wherein deducing the unoccupied state of the building is based at least in part on the predictive schedule.

5. The method of claim 1, further comprising:
   adjusting a building parameter based at least in part on the increased confidence of the unoccupied state.

6. The method of claim 5, wherein the building parameter is a climate parameter.

7. The method of claim 5, wherein the building parameter is a lighting parameter.

8. The method of claim 5, wherein the building parameter is a security parameter.

9. The method of claim 1, wherein the real time event is a location device being in a specific location.

10. The method of claim 1, wherein the real time event is a location device heading in a specific direction.

11. The method of claim 1, wherein the real time event is detected with a location device incorporated into a mobile device.

12. A computing device configured for controlling parameters in a building, comprising:
    a processor;
    memory in electronic communication with the processor; and
    instructions stored in the memory, the instructions being executable by the processor to:
       detect a real time event at a building using at least one sensor associated with a user device, wherein detecting the real time event is based at least in part on a first directional movement of the user device;
       determine a confidence of an unoccupied state of the building based at least in part on a predictive schedule of unoccupied times of the building and detecting the real time event;
       increase the confidence of the unoccupied state upon detecting an occurrence of a second real time event after a pre-determined period of time from the occurrence of the real time event, wherein the occurrence of the second real time event is based at least in part on a second directional movement of the user device different from the first directional movement;
       predict a transition time from the unoccupied state to an occupied state based at least in part on a simultaneous occurrence of the real time event;
       override the predictive schedule of unoccupied times based at least in part on the confidence of the unoccupied state of the building exceeding a threshold value; and
       conserve resources associated with the building based at least in part on overriding the predictive schedule, wherein conserving the resources is based at least in part on adjusting parameters associated with controlling the building system.

13. The computing device of claim 12, wherein the instructions are further executable by the processor to:

adjust a building parameter in response increasing the confidence of unoccupancy.

14. A computer-program product for controlling parameters in a building, the computer-program product comprising a non-transitory computer-readable medium having instructions thereon, the instructions being executable by a processor to:

detect a real time event at a building using at least one sensor associated with a user device, wherein detecting the real time event is based at least in part on a first directional movement of the user device;

determine a confidence of an unoccupied state of the building based at least in part on a predictive schedule of unoccupied times of the building and detecting the real time event;

increase the confidence of the unoccupied state upon detecting an occurrence of a second real time event after a pre-determined period of time from the occurrence of the real time event, wherein the occurrence of the second real time event is based at least in part on a second directional movement of the user device different from the first directional movement;

predict a transition time from the unoccupied state to an occupied state based at least in part on a simultaneous occurrence of the real time event;

override the predictive schedule of unoccupied times based at least in part on the confidence of the unoccupied state of the building exceeding a threshold value; and conserve resources associated with the building based at least in part on overriding the predictive schedule, wherein conserving the resources is based at least in part on adjusting parameters associated with controlling the building system.

15. The computer-program product of claim 14, wherein the real time event is detected with a location device incorporated into a mobile device.

16. The computer-program product of claim 14, wherein adjusting parameters further comprises adjusting at least one of lighting in the building or temperature in the building.

17. The method of claim 1, wherein adjusting the parameters further comprises adjusting a level of security monitoring of the building.

18. The method of claim 1, wherein adjusting the parameters further comprises adjusting energy conservation parameters associated with the building.

* * * * *